United States Patent [19]
Johnson et al.

[11] 3,751,716
[45] Aug. 7, 1973

[54] PROTECTIVE EQUIPMENT FOR A SERIES CAPACITOR

[75] Inventors: Ingolf B. Johnson, Schenectady, N.Y.; Graham R. Mitchell, Willingboro, N.J.

[73] Assignee: General Electric Company, Philadelphia, Pa.

[22] Filed: Sept. 5, 1972

[21] Appl. No.: 286,469

[52] U.S. Cl.................... 317/12 A, 317/16, 317/20, 317/31, 317/36 TD
[51] Int. Cl. ............................................. H02h 7/16
[58] Field of Search..................... 317/12 A, 16, 20, 317/31, 12 B, 12 R, 36 TD

[56] References Cited
UNITED STATES PATENTS
2,351,988   6/1944   Marbury .......................... 317/12 A
3,249,814   5/1966   Price ................................ 317/12 A Primary Examiner—J. D. Miller
Assistant Examiner—Harvey Fendelman
Attorney—J. Wesley Haubner and William Freedman

[57] ABSTRACT

Protective means for a series capacitor comprises a normally-open triggered vacuum interrupter that is triggered into conduction to establish a bypass circuit shunting the capacitor in response to a condition producing an overvoltage across the capacitor. After the interrupter is so triggered, its contacts are driven into engagement to provide a solid metallic path for continued current flow through the bypass circuit. When the bypass circuit current subsides to a predetermined level, a resistor is inserted into the bypass circuit in series with the closed contacts of the interrupter, shortly after which said contacts are separated to interrupt the bypass circuit. Any restrike occurring in the vacuum interrupter during the latter interruption produces a low-current discharge through the series combination of the resistor and the interrupter that acts to clean up the contacts of the interrupter.

10 Claims, 2 Drawing Figures

PATENTED AUG 7 1973          3,751,716

PROTECTIVE EQUIPMENT FOR A SERIES CAPACITOR

BACKGROUND

This invention relates to means for protecting a capacitor that is connected in series with a power line from overvoltages resulting from excessive line current therethrough.

Examples of this type of capacitor-protective equipment are disclosed in the following U.S. Pat. Nos.: 2,207,577—Buell; 2,571,910—Marbury et al; 2,743,395—Marbury et al; 2,760,121—Roth; 2,878,428—Bockman; and 3,319,121—Lee.

Capacitors are sometimes connected in series with the high voltage transmission lines of a power system in order to increase the stability and power limits of the system control voltage drops during an electromechanical system disturbance and/or obtain desired directional transfer of power. To protect these series capacitors from overvoltages resulting from the flow of excessive line currents therethrough, it is customary to connect a normally non-conductive gap device in parallel with the series capacitor. If the line current should suddenly increase due to a fault on the power system, the voltage across the series capacitor will rise abruptly toward an excessive value. The gap device, however, is designed to break down before this voltage reaches a damaging value and, in so doing, to establish a low impedance shunt circuit around the series capacitor through which the excessive current can flow without developing excessive voltage across the series capacitor.

When the fault responsible for the excessive current is isolated, as by the opening of a circuit breaker located between the fault and the power line, the line current returns either to its normal value or to a higher-than-normal emergency operating value. It is important that the series capacitor be reinserted into the power line immediately after this fault removal, as this is the time its presence is most needed for the purpose of maintaining stability and voltage control of the power system.

Prior schemes for removing and later reinserting the capacitor in this manner have been subject to a number of disadvantages. Typically, they have been quite complicated and expensive and, even with their complications, have not been as precise and quick in their operation as might be desired.

A relatively simple and inexpensive way of performing the required functions is described and claimed in the aforementioned U.S. Pat. No. 3,319,121—Lee, assigned to the assignee of the present invention. There the protective device is a triggered vacuum circuit interrupter connected in the shunt or bypass circuit. When the voltage across the capacitor approaches an excessive value, the trigger of this device is operated to produce an arc-over between the then-open contacts of the device, thereby completing the bypass circuit. Immediately following such arc-over, the contacts of the triggered vacuum interrupter are driven into engagement to extinguish the high current arc therebetween and provide a solid metallic path for carrying the current then flowing through the bypass circuit. When the current through this bypass circuit (i.e., line current) later subsides, as when the fault is isolated, the contacts of the triggered vacuum interrupter are separated to interrupt the current then flowing through the bypass circuit.

One problem encountered with such an arrangement is that the vacuum interrupter sometimes has difficulty in interrupting the bypass circuit when its contacts are separated. Although the current then being interrupter is usually relatively light, a restrike sometimes occurs between the contacts during interruption or shortly thereafter; and this restrike can lead to an erroneous removal of the capacitor from the power line.

The probable cause of such a restrike is that the contacts of the vacuum interrupter are then in a relatively poor condition as a result of the heavy current arcing that had occurred between them prior to their being driven into engagement following initial completion of the bypass circuit. This poor condition of the contacts can render the triggered vacuum interrupter incapable of continuously withstanding the voltage present between its then-separated contacts.

SUMMARY

An object of the present invention is to construct the protective arrangement in such a manner that even if such restrikes do occur, they will not result in erroneous removal of the capacitor from the power lines.

Another object is to render the triggered vacuum interrupter capable of interrupting the bypass circuit and of maintaining the circuit open despite the occurrence of one or more of such restrikes.

Still another object is to provide a protective arrangement which, though it has the above insensitivity to restrikes, is still capable of promptly reestablishing the low impedance bypass circuit should the voltage across the capacitor at any time approach an excessive value.

In carrying out the invention in one form, we provide a normally-open triggered vacuum interrupter in the bypass circuit shunting the capacitor. After this interrupter has been triggered into conduction in response to a condition producing an overvoltage across the capacitor, thereby completing the bypass circuit, its contacts are driven into engagement to provide a solid metallic path for continued current flow through the bypass circuit. When the bypass circuit current has subsided to a predetermined level, a resistor is inserted into the bypass circuit in series with the closed contacts of the interrupter, shortly after which said contacts are separated to interrupt the bypass circuit. Any restrike occurring in the vacuum interrupter during the latter interruption produces a low-current discharge through the series combination of the resistor and the interrupter that acts to clean up the contacts of the interrupter.

BRIEF DESCRIPTION OF DRAWING

For a better understanding of the invention, reference may be had to the following description taken in connection with the accompanying drawings, wherein.

DETAILED DESCRIPTION OF PREFERRED EMBODIMENT

Figure 1:
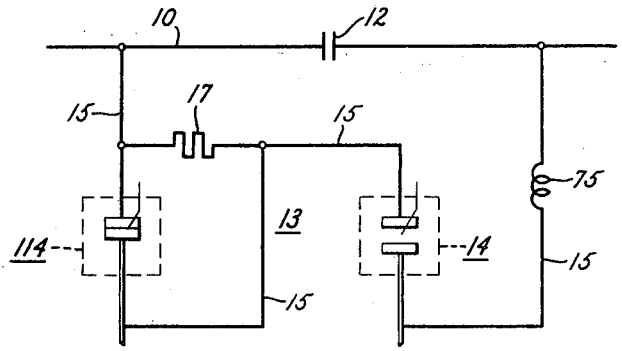
FIG. 1 is a simplified diagrammatic view of capacitor protective equipment embodying one form of the invention.

Referring now to the drawing, there is shown a high voltage alternating current transmission line 10 and a series capacitor 12 connected in series with line 10. For protecting series capacitor 12 from overvoltages that could result from excess current therethrough, a protective arrangement 13 is connected in parallel with capacitor 12.

As shown in the schematic diagram of FIG. 1, this protective arrangement 13 comprises two triggered vacuum circuit interrupters 14 and 114 connected in series with each other in a bypass circuit 15 that is connected in parallel with series capacitor 12. One of the triggered vacuum circuit interrupters 14 is a normally-open device, referred to hereinafter as the main interrupter; and the other 114 is a normally-closed device, referred to hereinafter as the auxiliary interrupter. Connected in parallel with the normally-closed auxiliary interrupter 114 and in series with the normally-open main interrupter 14 is a resistor 17 which is effectively shorted out by the normally-closed auxiliary interrupter 114. The manner in which these components operate and cooperate will soon be described in detail.

Figure 2:
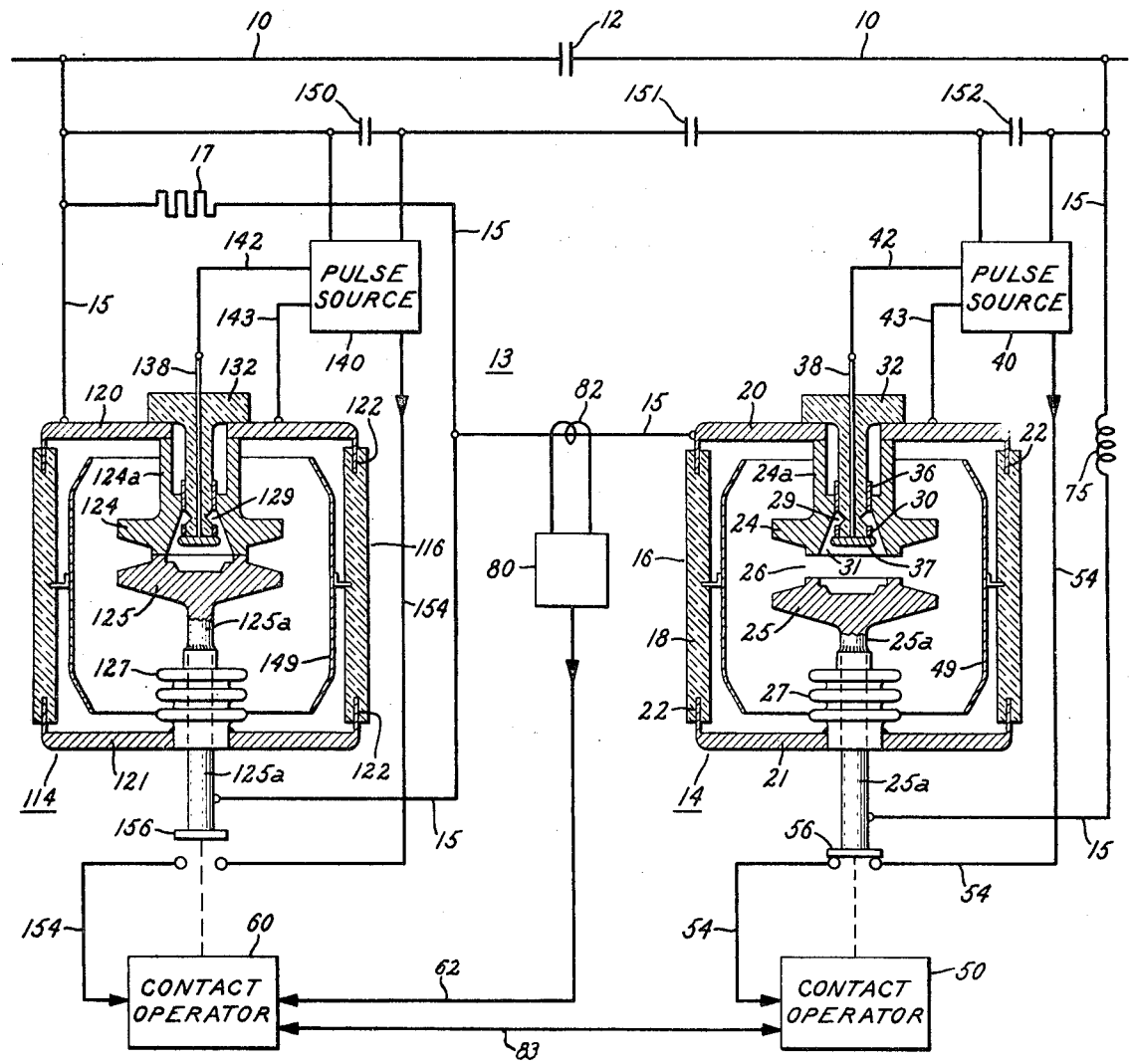
FIG. 2 is a more detailed view of the protective equipment of FIG. 1.

Referring to FIG. 2, the main interrupter 14 is preferably a triggered vacuum interrupter of the general type shown and claimed in the aforesaid U.S. Pat. No. 3,319,121—Lee. Accordingly, it comprises a sealed envelope 16 that is evacuated to a pressure of $10^{-5}$ mm. of mercury or lower. The envelope 16 comprises a casing 18 of a suitable insulating material, such as a ceramic, and a pair of metallic end caps 20 and 21 joined in vacuum-tight relation to the respective opposite ends of the insulating casing 18 by suitable seals 22.

Located within the evacuated envelope 16 is a pair of main electrodes 24 and 25 that are normally spaced apart to define a main or primary gap 26 located therebetween. These electrodes are preferably of a disk-shape configuration. Electrode 24 is a stationary electrode which is supported on the upper end plate 20 by means of a tubular supporting rod 24a; whereas electrode 25 is a movable electrode which is joined to and carried by an elongated conductive operating rod 25a that projects through an opening in the lower end plate 21. A flexible metallic bellows 27 is provided about the operating rod 25a to permit vertical movement thereof without impairing the vacuum inside the evacuated envelope 16. This bellows 27 is secured by suitable seals at its respective opposite ends to the operating rod 25a and the end plate 21.

For controlling the position of the movable contact 25 of main interrupter 14, suitable operating means 50, shown for simplicity in block form, is provided. This operating means 50 comprises means (not shown) for normally maintaining the movable contact 25 in its open position of FIG. 2. Immediately upon receiving a closing signal via a channel schematically shown at 54, operator 50 responds to quickly drive contact 25 in an upward closing direction into engagement with contact 24.

For causing the primary gap 26 to arc-over under certain conditions soon to be descfibed, there is provided a trigger gap 29 located within a centrally-disposed recess 31 provided in stationary electrode 24. This trigger gap is preferably constructed in generally the manner disclosed and claimed in U.S. Pat. No. 3,087,092—Lafferty, assigned to the assignee of the present invention. Accordingly, it comprises a cylindrical ceramic support 32 located within recess 31 and two thin layers 30 and 36 of metal bonded to the external surface of the ceramic support in spaced-apart relationship along the length of the support. These two layers of metal constitute the electrodes of the trigger gap. They are separated by a V-shaped groove 34 that extends about the circumference of the ceramic support and has its walls defined by the ceramic material itself. One of the trigger electrodes 36 is electrically connected to the main electrode 24. The other electrode 30 is normally electrically isolated from the main electrode 24.

As is well known, the lines of field distribution at the interface between a metal and a ceramic body in intimate contact are highly favorable to a breakdown at such an interface. Accordingly, a relatively low voltage applied across the trigger gap can initiate a discharge from one of these interfaces across the trigger gap.

For applying a voltage across the trigger gap, a conducting lead 38 is provided extending through a passageway in the ceramic support 32. At its inner end, this lead 38 is brazed to a metallic cap 37 which is in electrical contact with the trigger electrode 30. The metallic cap 37 is hermetically sealed to the inner end of the ceramic support 32 by conventional metal-to-ceramic sealing techniques so as to maintain the hermetic seal of the envelope.

For applying a triggering pulse to the trigger gap 29, a pulse source 40, with output leads 42 and 43, is provided. When pulse source 40 operates, it applies a voltage pulse between the trigger electrode 30 and 36 that establishes a small arc across trigger gap 29. This arc vaporizes some of the material of electrodes 30 and 36. These vapors are rapidly propagated, or ejected, into the primary gap 26, thus drastically reducing its dielectric strength and causing it to arc-over in response to the voltage then prevailing between main electrodes 24 and 25. The above-described metallic vapors are referred to hereinafter as charged conduction carriers.

Main electrodes 24 and 25 are made of a non-refractory metal, such as copper, that is substantially free of all gaseous impurities and impurities which, upon decomposition, will produce gases. Accordingly, the arc that is established between the main electrodes evolves no appreciable quantity of non-condensable gases from the main electrodes. This aids the main gap in recovering its dielectric strength immediately after a current zero is reached.

The arc across the main gap does vaporize metal from the main electrodes, but these are metallic vapors that can be readily condensed. For this purpose, a tubular metallic shield 49 is provided about the main gap 26 to intercept and condense the arc-generated metallic vapors as they are projected radially outward from the gap 26. This condensation of these metallic vapors occurs very rapidly, and this permits the gap to build up its dielectric strength at a very high rate when the current zero point is reached.

When current zero is reached at the end of a half cycle of arcing current, dielectric strength can be built up across the main gap 26 at such a high rate that the breakdown voltage on the next half cycle of current is again determined by the trigger gap rather than the main gap. If, following current zero, the pulse source supplies another pulse to the trigger gap 29, the trigger gap again sparks over, thus initiating another arc-over of the primary gap 26 and causing current to continue flowing until at least the next natural current zero.

For preventing the gap device from being damaged or otherwise impaired by unduly prolonged arcing, we cause the operating means 50 to rapidly drive the movable contact 25 into engagement with stationary contact 24 immediately following an arc-over of primary gap 26 by the trigger means. Such contact engagement establishes a solid metallic path between the contacts 24, 25, thereby extinguishing the arc previously present.

For causing operating means 50 to perform in this manner, a signal channel 54 is provided between operating means 50 and pulse source 40. When pulse source 40 supplies a pulse to trigger gap 29, a signal is transmitted over this channel 54 to operating means 50. Operating means 50 responds to the signal to drive movable contact 25 into engagement with stationary contact 24, as above-described.

In a preferred embodiment, the auxiliary circuit interrupter 114 is also of the triggered vacuum interrupter type. Since auxiliary circuit interrupter 114 is substantially identical to main interrupter 14, no detailed description thereof is considered necessary. Corresponding parts of the two interrupters have been assigned similar reference numerals, differing only in that the prefix "1" appears ahead of those numerals used for auxiliary interrupter 114.

Auxiliary interrupter 114 is a normally-closed device having its movable contact 125 normally maintained in engagement with stationary contact 124. The position of movable contact 125 is controlled by suitable contact operating means 60, schematically shown in block form. When operating means 60 receives an opening signal via a channel schematically shown at 62, it responds by immediately driving contact rod 125a downwardly to separate movable contact 125 from stationary contact 124.

If current is then flowing through interrupter 114, separation of its contacts draws an arc therebetween. This arc persists until a natural current zero, at which time the arc is prevented from reigniting by the high dielectric strength of the vacuum.

To aid in condensing the metal vapors generated by such arcing so as to permit a rapid recovery of dielectric strength, a shield 149 is provided. This shield serves the same purpose as shield 49 of interrupter 14.

Interrupter 114 includes a trigger gap 129 corresponding to trigger gap 29 of interrupter 14. For sparking over this trigger gap 129 in response to predetermined conditions, a pulse source 140 is provided having output leads 142 and 143 connected across trigger gap 129 via parts 138 and 120.

The two pulse sources 40 and 140 are arranged to operate in response to the voltage across capacitor 12 reaching a predetermined level. In this connection, three high impedance voltage-dividing capacitors 150, 151, and 152 are shown connected across series capacitor 12 so that the voltage appearing across each is proportional to the voltage across capacitor 12. The voltage across one capacitor 150 is fed to pulse source 140 as input information and that across 152 is fed to pulse source 40 as input information. When these voltages exceed a suitable value, predetermined for each pulse source, the pulse source operates to develop an output pulse.

Assume now that the protective arrangement 13 is in its condition of FIGS. 1 and 2 and that a fault develops on line 10. This will cause a rapid increase in line current, which abruptly increases the voltage across capacitor 12. When this voltage reaches a predetermined level, pulse source 40 (FIG. 2) develops a voltage pulse which immediately sparks over trigger gap 29, which, in turn, immediately produces an arc-over of primary gap 26. This arc-over completes the bypass circuit 15 through the two interrupters 14 and 114, thus establishing a low impedance shunt around capacitor 12, which prevents a further increase in the voltage thereacross. Completion of this low impedance shunt 15 allows capacitor 12 to discharge therethrough thus producing a very high current in circuit 15, limited primarily by a reactor 75 providing for current-limiting purposes.

As soon as primary gap 26 arcs-over as above described, contact-operating means 50 receives a closing signal via channel 54 and responds by driving contact 25 into engagement with contact 24. This extinguishes the arc between the contacts and establishes a solid metallic circuit through interrupter 14. So long as the fault which initiated arc-over of interrupter 14 remains unisolated, the current through power line 10 and interrupter 14 is high. But when this fault is finally isolated, the current falls to a much lower level.

To sense this fall in current, a suitable current sensor 80 is coupled to the bypass circuit 15 through a current transformer secondary winding 82. When the current falls to a predetermined level, current sensor 80 supplies an opening signal to contact-operator 60 for interrupter 114. Operator 60 responds by quickly operating to drive contact rod 125a downwardly, thereby separating the contacts of interrupter 114, thus interrupting the circuit therethrough, as above described. This removes the short circuit from around the resistor 17, effectively inserting the resistor into the bypass circuit 15 in series with the then-closed contacts of interrupter 14. The resistor 17 is typically of such a size that only about 20 percent of the line current flows therethrough under these conditions. Accordingly, the capacitor 12 is effectively reinserted into the power circuit upon opening of interrupter 114 and is thus then available to help maintain stability.

Depending on contingencies involved and criteria applied, approximately 1½ to 15 cycles after the interrupter 114 has been opened to insert the resistor 17 in series with the then-closed interrupter 14, interrupter 14 is opened to interrupt the bypass circuit 15. Such opening is effected by operator 50 acting on information supplied via a channel 83. When this interrupting operation is completed, the capacitor 12 is fully returned to the line 10 and all of the line current flows therethrough. Not infrequently, during this interrupting operation, restrikes, or reignitions, occur across the gap 26 of the interrupter 14. The probable cause of such restrikes is that the contacts of the interrupter 14 are then in a relatively poor condition as a result of heavy current arcing that had occurred between them prior to their being driven into engagement at the start of the capacitor-removal operation. Such heavy current arcing, especially when followed as it is by closing impact and resultant welding and by subsequent breaking of the weld on opening, often leaves the contacts with sharp protuberances. This poor condition of the contacts impairs the dielectric properties of the gap 26 and thus can render the vacuum interrupter incapable of withstanding the voltage present between its contacts.

Our protective arrangement not only can tolerate such restrikes but is actually improved by them. In this respect, a restrike across gap 26 is not followed by flow of any great amount of current, as would be the case in certain prior art arrangements, but only by the current that can flow through resistor 17, which is then in series with interrupter 14 and no longer shorted out by auxiliary interrupter 114. This is a relatively low current which the interrupter can easily interrupt at the next current zero following the restrike.

The short-duration low current arc produced by such a restrike is actually beneficial in that it cleans up the contacts of the interrupter 14 by burning off, or vaporizing, the above-described protuberances thereon, thus improving the dielectric properties of gap 26. Should one or more additional restrikes occur as a result of any remaining protuberances, these protuberances would be similarly burned off, or vaporized, by the resulting arc.

About 20 cycles after the interrupter 14 has been opened and the probability of a restrike in interrupter 14 has become negligible, the then-open interrupter 114 is closed to reestablish the normal short circuit around resistor 17, thus restoring the protective equipment to its original condition, depicted in FIGS. 1 and 2. A suitable timer (not shown) within operating means 60 determines the length of time intervening between opening of interrupter 14 and closing of interrupter 114 with information as to the opening of interrupter 14 being supplied via channel 83.

It is important that the auxiliary interrupter 114 not close while there is still a significant probability of a restrike in main interrupter 14. This is the case because if such a restrike occurs while the auxiliary interrupter 114 is closed, the low impedance bypass circuit 15 (with resistor 17 shorted out) is reestablished around the capacitor 12, discharging the capacitor and erroneously removing it from the line. But if a restrike occurs while interrupter 114 is still open, the resistor 17 is available to limit the extent of capacitor discharge and to enable the main interrupter 14 to recover its dielectric strength on the next current zero following the restrike.

If resistor 17 was shorted out at the time a restrike occurred, a very high current, i.e., the full capacitor discharge current, would follow the restrike, and the main interrupter 14 would have great difficulty interrupting such high current at the next current zero. Even if interruption at this instant was successful, the contacts of the main interrupter 14 would have been subjected to unnecessary high current arcing and resultant impairment thereby.

Another significant advantage that results from inserting the resistor 17 in the bypass circuit prior to interruption thereof by main interrupter 14 is that the reinsertion transient voltages and possible trapped charges among one or more capacitor segments in a bank or one or more capacitor banks are much less severe than they would be if there was no preinsertion of resistance prior to opening of the interrupter 14. The ohmic value of the resistor determines the severity of the reinsertion transient voltages and of the trapped charges. Preferably, our resistor 17 has an ohmic value in the range of about three to five times the capative reactance ($X_c$) of the reinserted capacitor.

There is a possibility that during the above-described period when the auxiliary interrupter is open, a fault or other over-voltage-producing condition could develop on power line 10. To protect the capacitor 12 from such overvoltage, it is important that the protective arrangement be capable of immediately reestablishing the low impedance bypass circuit around capacitor 12. Our protective arrangement has this capability because auxiliary interrupter 114 has triggering means (129, 140) which in response to such an incipient overvoltage can immediately trigger the then-open interrupter 114 into conduction, thus immediately reestablishing the low impedance bypass circuit. It is noted that this low impedance bypass circuit is established without waiting for the contacts 124, 125 of the auxiliary interrupter 114 to be closed. If the main interrupter 14 is open at the time of this incipient overvoltage, its triggering means 29, 40 will also immediately trigger it into conduction so that the bypass circuit 15 will be completed when auxiliary interrupter 114 becomes conductive.

Immediately following such triggering of auxiliary interrupter 114, the operator 60 thereof operates to engage contacts 124, 125 of interrupter 114 in response to a signal supplied via a channel 154. This quick closing operation by the operator 60 protects interrupter 114 from the effects of prolonged arcing.

Each time one of the pulse sources 140 or 40 supplies a triggering pulse to its associated interrupter, the pulse source also supplies a signal to the operator of the interrupter, if the interrupter is open, commanding the operator to close the interrupter. This signal is blocked if the interrupter is already closed by switches 56 and 156 that are respectively open when their associated interrupter is closed.

Although we have depicted each interrupting device 14 and 114 as comprising only a single pair of separable contacts, it is to be understood that each interrupting device could comprise a plurality of series-connected pairs of separable contacts arranged for simultaneous operation in a suitable conventional manner. Such plural pairs of series-connected contacts are needed when the circuit voltage is higher than that which can be handled by a single pair. One way of providing plural pairs of contacts is to construct each interrupting device of a plurality of separate vacuum interrupter units, each as shown in the drawing, with means for mechanically interconnecting the movable contact rods of the interrupter units.

Although our perferred embodiment utilizes a triggered vacuum interrupter 114 for the auxiliary interrupter, other suitable types of interrupting devices can instead be utilized for this auxiliary interrupter duty. An example of another suitable type is the gap device disclosed and claimed in the above-mentioned U.S. Pat. No. 2,760,121—Roth, assigned to the assignee of the present invention. When used for this duty, the Roth gap device, which is normally-open, is provided with means for triggering it into conduction at substantially the same time as the main interrupter 14 is triggered into conduction as hereinabove described, thus completing the required bypass circuit through the two interrupting devices in series. Current through the Roth gap device continues to flow so long as the line current remains high. But when this current subsides to a predetermined level, the gap device returns to its normally non-conductive state, inserting the resistor in series with the main interrupter 14, shortly after which the main interrupter 14 opens to interrupt the bypass circuit current in the same manner as described hereinabove.

In another modified form of the invention, we use a non-linear resistor in place of the linear resistor 17 shown. The use of such a non-linear resistor reduces the transient voltages developed when auxiliary interrupter 114 is opened to insert the resistor. Such non-linear resistor is of a material having a negative resistance-current characteristic; such as the material sold by General Electric Company under the trademark Thyrite. The non-linear resistor is sized to have a resistance equal to a value in the range of three to five times $X_c$ at an applied instantaneous voltage equal to the voltage across the capacitor 12 that causes pulse source 40 to initiate arc-over of the main interrupter 14. $X_c$ is the capacitive reactance of capacitor 12.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What I claim as new and desire to secure by Letters Patent of the United States is:

1. Means for protecting a capacitor that is connected in series with a power line from overvoltages resulting from excessive line current therethrough, comprising:
   a. a first interrupter of the triggered vacuum type comprising: an evacuated envelope, relatively movable contacts therein that are separable to establish a primary gap therebetween, and trigger means operable to produce an arc-over of said primary gap,
   b. a second interrupter having separable contacts connected in series with the contacts of said triggered vacuum interrupter in a bypass circuit for shunting said capacitor,
   c. a resistor connected in parallel with the contacts of said second interrupter and in series with the contacts of said triggered vacuum interrupter,
   d. means for normally maintaining the contacts of said second interrupter in a closed position for effectively shorting out said resistor,
   e. means for normally maintaining the contacts of said triggered vacuum interrupter in an open position for effectively blocking current through said bypass circuit,
   f. means responsive to a condition producing an overvoltage across said capacitor for operating the trigger means of said triggered vacuum interrupter to produce an arc-over of its primary gap, thereby completing said bypass circuit through said first and second interrupters,
   g. means for engaging the contacts of said first interrupter immediately following operation of said trigger means to arc-over said primary gap, thereby providing a solid metallic path for current through said bypass circuit,
   h. means for separating the contacts of said second interrupter when the current through said power line subsides to a predetermined level, thereby inserting said resistor into said bypass circuit in series with the then-engaged contacts of said first interrupter,
   i. and means for separating the contacts of said first interrupter to interrupt said bypass circuit shortly after insertion of said resistor into said bypass circuit.

2. The protective means of claim 1 in which:
   a. said second interrupter is also a triggered vacuum interrupter comprising: an evacuated envelope in which the separable contacts of said second interrupter are located, and trigger means operable to produce an arc-over between said separable contacts while said second contacts are separated, and
   b. means is provided for operating the trigger means of said second interrupter to produce an arc-over between the separated contacts thereof should the voltage across said capacitor reach a predetermined level when said contacts of said second interrupter are separated.

3. The protective means of claim 1 in combination with means for restoring the contacts of said second interrupter to an engaged position after the contacts of said first interrupter have been maintained separated for a predetermined period, this restoring the protective means to its normal condition.

4. The interrupter of claim 1 in which any restrike occurring in said first interrupter following separation of its contacts while said second interrupter is open produces a low current discharge through the series combination of said resistor and said first interrupter that cleans up the contacts of said first interrupter.

5. The interrupter of claim 4 in combination with means for restoring the contacts of said second interrupter to an engaged position after the contacts of said first interrupter have been maintained separated for a predetermined period sufficiently long to reduce to insignificance the probability that further restrikes will occur in the first interrupter until after the first interrupter is again caused to arc-over by operation of its trigger means.

6. The interrupter of claim 1 in which said resistor has an ohmic value in the range of three to five times the capacitive reactance of said capacitor.

7. The interrupter of claim 1 in which said resistor is a non-linear resistor having an ohmic value in the range of three to five times the capacitive reactance of said capacitor at an instantaneous voltage applied to said resistor equal to the voltage across the capacitor that causes said trigger means to operate to produce an arc-over of said primary gap.

8. Means for protecting a capacitor that is connected in series with a power line from overvoltages resulting from excessive line current therethrough, comprising:
   a. a first interrupter of the triggered vacuum type comprising: an evacuated envelope, relatively movable contacts therein that are separable to establish a primary gap therebetween, and trigger means operable to produce an arc-over of said primary gap,
   b. means for connecting said contacts in a bypass circuit for shunting said capacitor,
   c. means for normally maintaining the contacts of said triggered vacuum interrupter in an open position for effectively blocking current through said bypass circuit,
   d. means responsive to a condition producing an overvoltage across said capacitor for operating the trigger means of said triggered vacuum interrupter to produce an arc-over of its primary gap, thereby completing said bypass circuit through said first interrupter,
   e. means for engaging the contacts of said first interrupter immediately following operation of said trigger means to arc-over said primary gap, thereby providing a solid metallic path for current through said bypass circuit, f. a resistor associated with bypass circuit, g. means including a second interrupter shorting out said resistor during most of the period when current is flowing through said bypass circuit but operable when the current through said power line subsides to a predetermined level to insert said resistor into said bypass circuit in series with the still-engaged contacts of said first interrupter, h. and means for separating the contacts of said first interrupter to interrupt said bypass circuit shortly after insertion of said resistor into said bypass circuit.

9. The interrupter of claim 8 in which any restrike occurring in said first interrupter following separation of its contacts while said second interrupter is open produces a low current discharge through the series combination of said resistor and said first interrupter that cleans up the contacts of said first interrupter.

10. The interrupter of claim 8 in which said resistor has an ohmic value in the range of three to five times the capacitive reactance of said capacitor.

* * * * *